DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED DECEMBER 1, 1970

881 O.G. 21

T881,004

REINFORCED FOAMED THERMOPLASTIC MATERIALS

William Bruce Ian Small, Welwyn Garden City, England, assignor to Imperial Chemical Industries Limited, Millbank, London, England, a corporation of Great Britain

Filed Apr. 27, 1970, Ser. No. 32,405

Claims priority, application Great Britain, May 2, 1969, 22,512/69

Int. Cl. B29d *27/08*

U.S. Cl. 264—51

No Drawing. 7 Pages Specification

A process for producing a reinforced foamed thermoplastic structure from a foamable thermoplastic composition consisting of a thermoplastic material such as polymers and copolymers of propylene, 4-methyl pentene, polyvinyl chloride and various nylons and a blowing agent which yields a gas on heating, such as the volatile liquids of hydrocarbons and halogenated hydrocarbons as pentene and methyl chloride respectively, or solid materials which decompose on heating such as sulphohydrazines and N-nitroso compounds is disclosed. The foamable thermoplastic composition is placed in a mold through which extends at least one hollow body, heat is applied through the hollow body supplied by a heated fluid at or above the activation temperature for the blowing agent thereby foaming the thermoplastic material so that it envelopes the part of the hollow body or bodies within the mold. Heat may also be applied externally to the structure by means of the mold surface concurrently with the heat supplied through the hollow body. The process is especially useful for the production of rigid thermoplastic pallets for fork lift trucks.